JOHN G. HILL
JOHN M. LYNCH
INVENTORS.

BY
ATTORNEY

JOHN G. HILL
JOHN M. LYNCH
INVENTORS.

BY
ATTORNEY

United States Patent Office 3,480,716
Patented Nov. 25, 1969

3,480,716
MULTIPLE ELECTRODE VACUUM ARC FURNACE AND METHOD OF REMELT PURIFICATION
John M. Lynch, Los Gatos, and John G. Hill, San Jose, Calif., assignors to United Aircraft Corporation, East Hartford, Conn., a corporation of Delaware
Filed Dec. 11, 1967, Ser. No. 689,552
Int. Cl. H05b 7/18
U.S. Cl. 13—9          8 Claims

ABSTRACT OF THE DISCLOSURE

An improved vacuum arc furnace comprising an annular furnace shell and a plurality of electrodes uniformly spaced and supported within said shell. Means are provided to supply and regulate current to all the electrodes for vacuum arc purification of the electrode metal and cooling is provided at both the internal and external walls of the annular shell whereby purified metal of high uniformity is obtained.

BACKGROUND OF THE INVENTION

Metals used in the fabrication of rocket motor cases and pressure vessels must meet extremely stringent requirements with respect to segregation, porosity and non-metallic inclusions. Particularly in the case of maraging and high alloy steels, the ingots produced by the conventional air melt processes have not been able to meet these requirements and the vacuum arc remelt purification process has been developed to produce metals with improved characteristics. According to this process, the ingot to be remelted is employed as a consumable electrode and remelted under vacuum by means of an electric arc to further purify the metal. Controlled cooling is employed to diminish segregation and porosity.

In order to produce a large rocket motor case, for example, an arc remelted ingot weighing about 25 tons is required and such ingots are produced as 50-in. diameter cylinders 7.5-ft. long. Such configurations prevent controlled solidification at both ends and in the center and contain considerable waste material. Further, since rocket motor cases and components thereof are fabricated by roll-ring forging operations, numerous breakdown operations must be performed on the ingot to form it into a configuration suitable for the forging operations. For example, when ring forging operations are to be performed on the remelted ingot, it is necessary to both shorten the ingot and punch out the center. This center material is wasted and must be reprocessed.

According to this invention, a furnace is provided which is capable of producing highly homogeneous remelted ingots having less wastage than heretofore obtained. The furnace provides for more uniform cooling of large ingots, employs small air melt electrodes which have a higher degree of uniformity than larger air melt electrodes and produces ingots which are annular. Such ingots are capable of use directly in subsequent roll-ring forging operations or in other hot or cold working operations for which annular shapes are suitable without the waste heretofore encountered.

It is accordingly an object of this invention to provide a multiple electrode vacuum arc furnace.

It is another object of this invention to provide a process for producing high quality ingots.

It is another object of this invention to provide a vacuum arc furnace producing an annular ingot.

It is another object of this invention to provide a vacuum arc furnace having means for improved control of cooling of the remelted ingot.

It is another object of this invention to provide vacuum arc furnace for producing high quality ingots.

Figure 1:
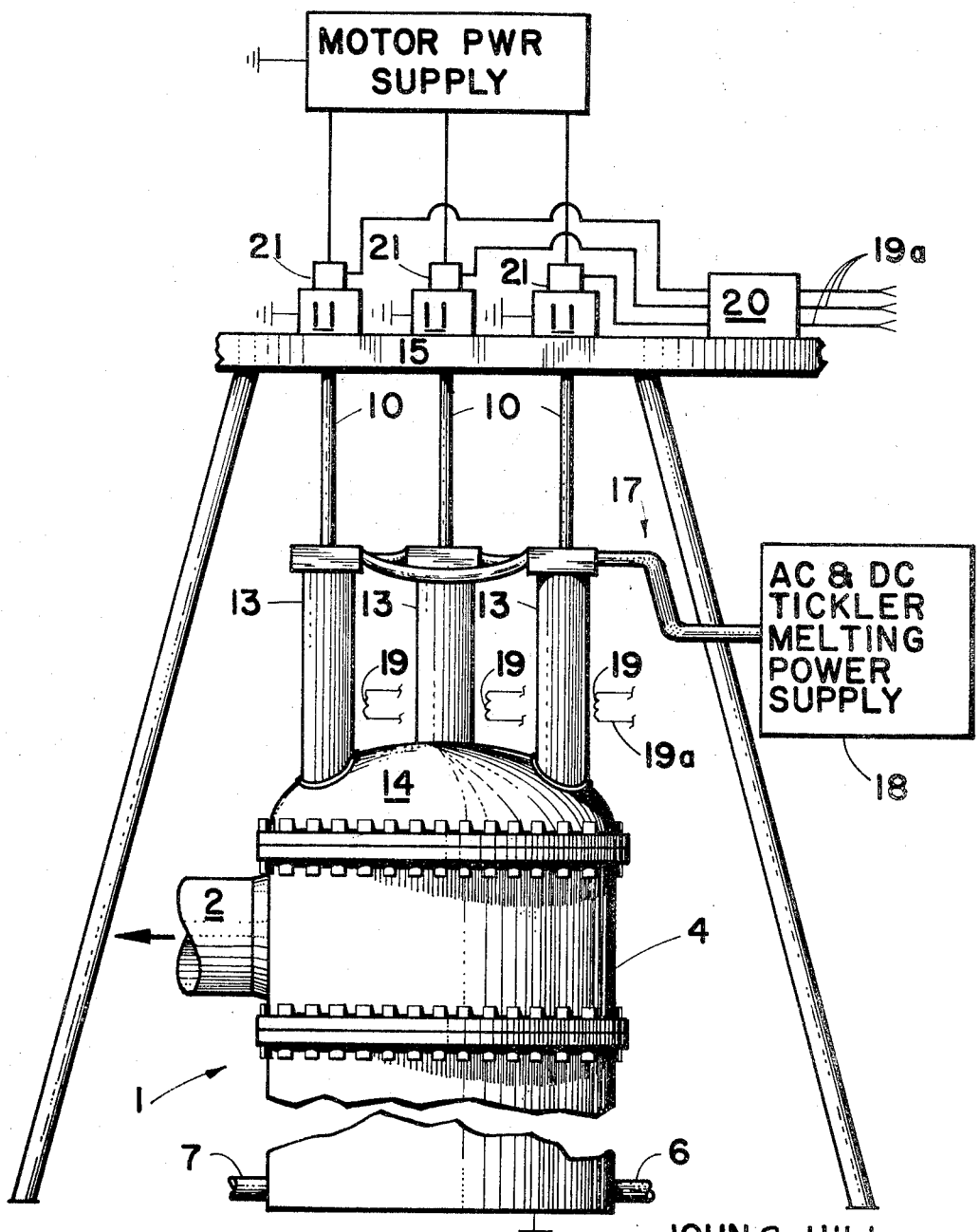
Figure 2:
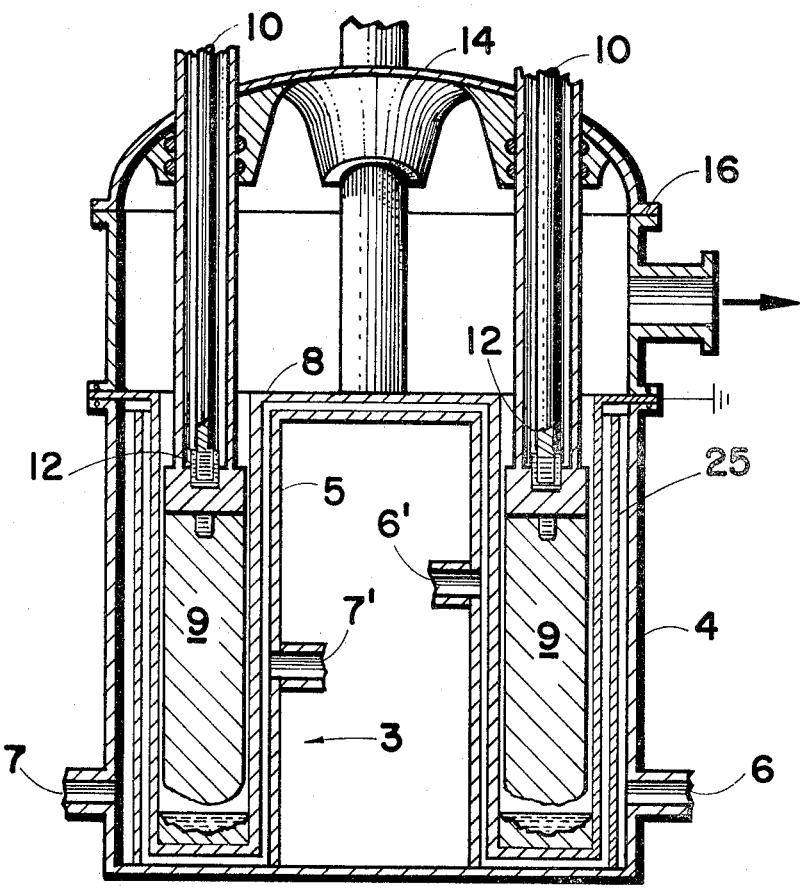
Figure 3:
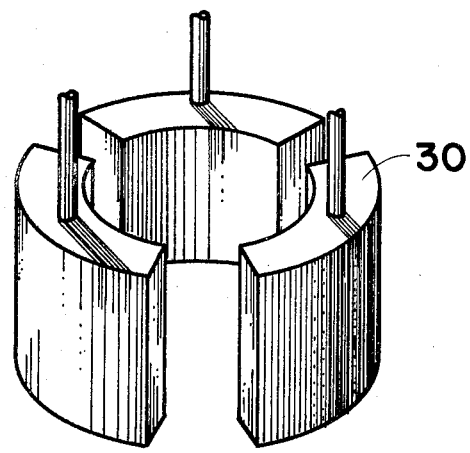

These and other objects of the invention will be readily apparent from the following description with reference to the accompanying drawing wherein:

FIGURE 1 is a front partially schematic view of an embodiment of this invention, FIGURE 2 is a front sectional view of a portion of FIGURE 1, and FIGURE 3 is a perspective view of an embodiment of electrode according to this invention.

Referring now to FIGURES 1 and 2, a vacuum arc remelting system according to this invention comprises a furnace 1 connected to means 2 for evacuating the interior of furnace 1. Furnace 1 comprises a water jacket 3 defining an annular water space between outer wall 4 and inner wall 5 through which cooling water may be circulated by means of inlet 6 and outlet 7. An annular furnace shell 8, preferably made of copper, is received within the annular space between walls 4 and 5 with sufficient clearance being provided to allow for the free circulation of water around shell 8. Additional coolant inlet and outlet ports 6' and 7' and baffle means 25 can also be provided to improve the control of coolant flow. A plurality of electrode assemblies 9 which are to be purified by the vacuum arc remelt process are equidistantly supported in shell 9 by support rods 10 which are connected to reversible D.C. torque motors 11, mounted on support structure 15, by a conventional ball nut-ball screw drive to permit the controlled lowering and raising of each individual electrode. Supports 10 are insulated from electrodes 9 as shown at 12 to prevent the arc melting current from flowing into the drive motor 11. Stingers 13 are conductively connected to electrode assemblies 9 and pass in sealed sliding relationship through the cover 14 of furnace 1, which is insulated from the remainder of the furnace at 16. A bus bar assembly 17 of sufficient flexibility to permit relative motion of the stingers 10 supplies electric power to the stingers from source 18.

The current flowing through each electrode assembly is monitored by inductive means 19 which produce signals representative of current flow which are fed to a comparator means 20 by lines 19a. Comparator 20 compares the input signals to a predetermined standard and produces signals representative of any disparity which selectively adjust the position of electrodes 10 through motor control means 21, to maintain a current flow through all electrodes substantially equal. While automatic means are preferred, it is readily apparent that an operator could also adjust the position of the electrodes in response to visual monitoring of ammeters measuring current flow.

In operation, the electrodes 9 will be equally positioned above the bottom of shell 8 such that an arc will be struck across each electrode upon initiation of current flow. Metal may be placed in the bottom of shell 8 to protect the same as is known to the art, if desired. The furnace is then evacuated and the arcs are struck. Cooling water is continuously circulated around shell 8 throughout the operation of the device and temperatures may be monitored and the flow of coolant controlled to produce any desired cooling rate of the melted ingot. As the electrodes 9 are consumed by the arc, they are continuously lowered by motors 9 and the position of the electrodes adjusted to maintain a uniform melting rate of the ingots and to adjust for any usual changes in the configuration of the electrodes, which may be caused by voids or other imperfections in the electrodes. The device permits controlled cooling of both the inside and the outside of the annular melt and substantial improvements in the metallurgical properties of the remelted ingot are obtained. Less segregation and porosity and fewer non-metallic inclusions are obtained as a result of the improved cooling characteristics. In addition, the ingot is in a form more suitable for subsequent processing.

Rather than using a cylindrical electrode as in FIGURES 1 and 2, other configurations can be used. A particularly desirable configuration being a segment of a ring such as shown in FIGURE 3, each segment 30 being cut from the same ring casting. In this manner the ingot electrodes to be purified will have a more uniform initial composition than could be obtained by using separately cast ingots and serves to improve the quality of the subsequently purified metal.

A unitary annular ingot could also be employed as a multiple electrode if a plurality of separate arcs can be established at the base of such an ingot. However, the control of the arcs and the current flow through the ingot is more difficult than when using a plurality of separate electrodes.

EXAMPLE 1

A vacuum arc purified ingot of D6aC steel weighing approximately 25 tons is prepared in the form of a ring 10-ft. in height, and 50-in. OD and 40-in. ID in the above described apparatus. The ingot is prepared by melting nine cylindrical ingots 8-in. diameter and 9-ft. long with an arc from a 60 kva.-15,000 amp source. The arc causes melting of the electrode and cooling water is circulated through the water jacket to produce metal solidification from both the internal and external surfaces of the annular ingot. The coolant flow can be adjusted to produce solidification and cooling of the ingot at rates which are equal at both internal or external surfaces or different at said surfaces. Better control of the cooling and solidification rates of the ingot is thereby obtained and an ingot of higher homogeneity will be produced than could be produced by casting of a solid cylindrical ingot of comparable OD.

In the above example, nine consumable electrodes were required to supply sufficient metal for a large melt. In order to reduce the number of control motors required, three electrode assemblies, each comprising three electrodes, may be employed, the electrode assemblies being uniformly spaced about the furnace and each assembly having an associated control motor.

EXAMPLE II

Three consumable electrodes of D6aC steel are prepared by cutting substantially equal segments from a ring ingot, OD 50-in. ID 34-in. After machining, each electrode has an outer arc length of about 50-in. and weighs about 16,000 pounds. These electrodes are uniformly spaced in the above described apparatus and melted with a current of 20,000 amp, 120 kva. per electrode.

The invention has been described with respect to certain embodiments thereof, however, the invention should not be considered as being limited thereto. Various modifications will suggest themselves to workers skilled in the art and can be made without departing from the scope of this invention which is limited only by the following claims wherein:

We claim:

1. In a process for the vacuum arc purification of a metal comprising the steps of maintaining a vacuum in a furnace, forming an electric arc at the surface of the metal to be purified within said furnace, melting the metal by the heat generated by said arc and collecting the melted metal in said furnace, the improvement which comprises forming said melted metal into an annulus in said furnace and cooling the internal and external surfaces of said annulus.

2. The process of claim 1 further comprising the steps of forming said metal to be purified into a plurality of electrode assemblies, uniformly spacing said electrode assemblies, in said furnace and maintaing an arc at the surface of each of said electrode assemblies.

3. The process of claim 2 wherein said electrodes are formed in the shape of ring segments by being cut from an annular ingot.

4. A vacuum arc furnace comprising:
 (a) an annular furnace shell comprising a base and concentrically oriented inner and outer walls extending upwardly therefrom,
 (b) means for circulating a coolant over the external surfaces of said inner and outer walls,
 (c) a plurality of consumable electrode assemblies uniformly spaced and supported within said furnace shell,
 (d) means for supplying an electric current to each of said electrode assemblies for creating an arc at the bottom of each said electrode assemblies,
 (e) drive means for lowering said electrode assemblies into said furnace shell as the electrodes are consumed by said arc, and
 (f) evacuating means for maintaining the interior of said furnace under reduced pressure.

5. The furnace of claim 4 further comprising means for equalizing the current flow through each of said electrode assemblies.

6. The furnace of claim 4 wherein said drive means comprises individually controllable drive means associated with each electrode assembly.

7. The furnace of claim 6 further comprising means for producing a signal representative of the current flow through each said electrode, means for comparing said signals and means for activating said controllable drive means to position the electrodes such that said signals are maintained substantially equal and constant.

8. A vacuum arc furnace comprising:
 (a) an annular furnace shell comprising a base and concentrically oriented inner and outer walls extending upwardly therefrom,
 (b) means for circulating a coolant over the external surfaces of said inner and outer walls,
 (c) at least one consumable electrode assembly uniformly disposed around and supported within said furnace shell,
 (d) means for supplying an electric current to each said consumable electrode assembly for creating an arc at the bottom thereof,
 (e) drive means for lowering each said consumable electrode assembly into said furnace shell as the electrode is consumed by said arc, and
 (f) evacuating means for maintaining the interior of said furnace under reduced pressure.

References Cited

UNITED STATES PATENTS

| | | | |
|---|---|---|---|
| 2,370,467 | 2/1945 | Hopkins | 164—52 |
| 3,186,043 | 6/1965 | Murtland et al. | 164—4 |
| 3,393,266 | 7/1968 | Wynne | 13—31 |

BERNARD A. GILHEANY, Primary Examiner

H. B. GILSON, Assistant Examiner

U.S. Cl. X.R.

13—31, 18